United States Patent [19]
Crawford

[11] Patent Number: 5,244,640
[45] Date of Patent: Sep. 14, 1993

[54] GAS GENERATOR AND PRESSURE/REACTION REGULATOR FOR USE THEREWITH

[76] Inventor: J. Harvey Crawford, 29003 Hurlburt Rd., Corvallis, Oreg. 97333

[21] Appl. No.: 699,683

[22] Filed: May 13, 1991

[51] Int. Cl.[5] .............................. B01J 7/00; C01B 3/08
[52] U.S. Cl. ..................................... 422/305; 422/208;
422/231; 422/232; 422/261; 422/275; 422/278;
422/279; 422/280
[58] Field of Search ............... 422/305, 163, 198, 208,
422/224, 227, 231, 232, 234, 235, 261, 275, 278,
279, 280, 205; 423/657

[56] References Cited

U.S. PATENT DOCUMENTS

| | | | |
|---|---|---|---|
| 324,179 | 8/1885 | Sloper | 423/657 |
| 1,490,975 | 4/1924 | Howard | 48/117 |
| 1,984,380 | 12/1934 | Odell | 423/454 |
| 2,345,487 | 3/1944 | Liedholm | 208/160 |
| 2,358,039 | 9/1944 | Thomas et al. | 208/164 |
| 2,464,616 | 3/1949 | Schwarzenbek et al. | 208/149 |
| 2,533,026 | 12/1950 | Matheson | 208/149 |
| 2,623,812 | 12/1952 | Eborall et al. | 423/651 |
| 2,721,789 | 10/1955 | Gill | 422/202 |
| 2,759,799 | 8/1956 | Berg | 423/651 |
| 3,129,060 | 4/1964 | Pohlenz | 423/651 |
| 3,197,284 | 7/1965 | Hoekstra | 423/658 |
| 3,205,044 | 9/1965 | Berger | 423/651 |
| 4,064,226 | 12/1977 | Becker et al. | 423/657 |
| 4,376,097 | 3/1983 | Emelock | 422/189 |
| 4,702,894 | 10/1987 | Cornish | 422/186.26 |
| 4,737,614 | 4/1988 | Szydlowski et al. | 48/61 |
| 4,755,190 | 7/1988 | Harris | 48/61 |
| 4,842,844 | 6/1989 | Harris et al. | 423/657 |
| 5,102,627 | 4/1992 | Plester | 422/305 X |

Primary Examiner—Robert J. Warden
Assistant Examiner—Amalia L. Santiago
Attorney, Agent, or Firm—Kolisch, Hartwell, Dickinson, McCormack & Heuser

[57] ABSTRACT

An gas generator is disclosed that generates gas from a pressure-producing reaction of reactant pieces and reactant fluid. The generator includes a pressure/reaction regulator for use with a reaction chamber. The regulator includes a reactant-fluid accumulator in communication with the reaction chamber via a reactant-fluid port for adjusting pressure in the chamber relative to a preselected threshold pressure. The regulator also includes at least one body extending substantially into the reaction chamber from the reactant-fluid port. The body is formed with holes for letting fluid under pressure into and out of the chamber. Also disclosed is such a regulator that is usable with a reaction chamber having plural reactant-fluid ports and includes plural bodies, one for each port. Certain bodies each have an associated check valve for allowing fluid into the reaction chamber, and certain other bodies each have an associated check valve with a counterweight for allowing fluid to exit the reaction chamber if pressure rises by a preselected increment above the preselected threshold pressure. The gas generator also includes a first and second condenser, with the latter being connected downstream of the former via a gas-exit port. The second condenser includes a spinner rotatably mounted in it for moving heavy, contaminant gases away from the gas-exit outlet under reaction pressure.

14 Claims, 2 Drawing Sheets

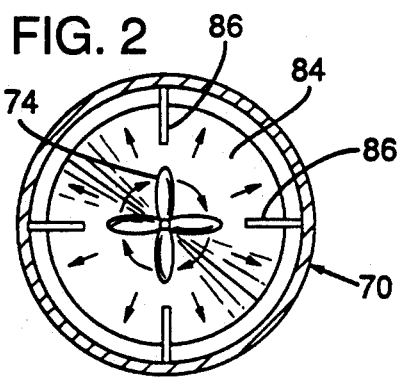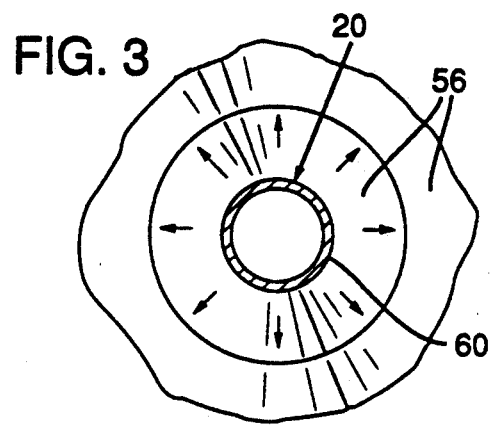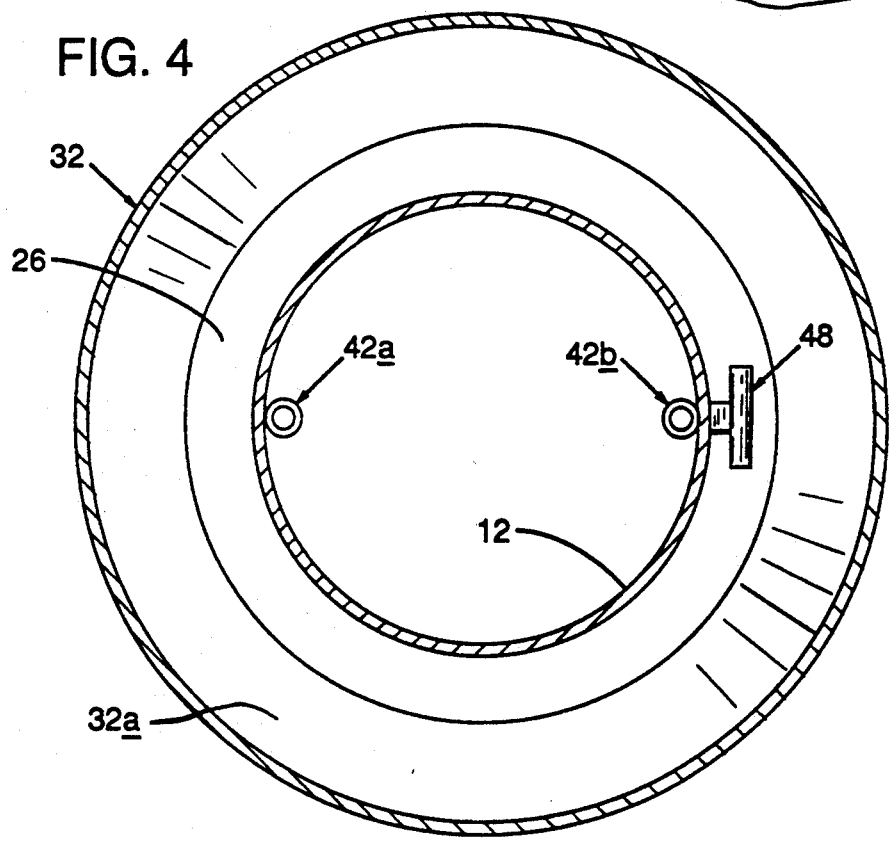

GAS GENERATOR AND PRESSURE/REACTION REGULATOR FOR USE THEREWITH

BACKGROUND OF THE INVENTION

The present invention relates to gas generators and more particularly to such generators which include a special pressure/reaction regulator, and to the latter per se.

At the outset it should be understood that the present invention will be described in the context of hydrogen gas generators. However, as will be understood, the invention is usable with other gas generators that produce desired gases from the reaction of reactant pieces, i.e. solid particles, and reactant fluid.

It is known to generate hydrogen by reacting nonferrous metals with acidic or basic solutions. However, development of conventional hydrogen generators has been slowed by the handling problems associated with highly explosive hydrogen gas.

As a way of dealing with such handling problems, certain proposals have been made to provide hydrogen generators that produce hydrogen gas "on demand" from easy-to-handle reactants such as acid/base reactant fluids and metallic reactant pieces. For example, U.S. Pat. No. 4,842,844 discloses a vertically mounted, multi-stage hydrogen generator that includes layers of retaining vessels that contain beds of metal fragments through which HCl is forced.

One processing problem that is presented by such "on demand" hydrogen generators (as well as other gas generators) has to do with the situation where system pressure exceeds a given threshold due to an undesired amount of metal fragments and fluid reactant being combined. To deal with such high pressure conditions, conventional gas generators include complex systems for relieving pressure that involve several moving parts. For example, in U.S. Pat. No. 4,842,844 there is disclosed a set of ports associated with the retaining vessels and outer containers which may be aligned to divert HCl (reactant fluid) away from the metal fragments, and thus to slow/stop the generation of hydrogen.

Another processing problem associated with gas generators is the problem of separating unwanted, contaminant byproduct gas(es) from the desired gas. For hydrogen generators, one such contaminant gas may be steam produced as a byproduct of the exothermic reaction between metal pieces and acidic or basic fluid reactants.

An object of the present invention is to provide an improved gas generator capable of dealing with high pressure conditions brought on by an undesired amount of reactant pieces and reactant fluid being combined in a reaction chamber.

Another object of the present invention is to provide a pressure/reaction regulator for use with gas generators to adjust reaction pressure.

Another object of the present invention is to provide an improved gas generator that is capable of separating unwanted, contaminant byproduct gas(es) from the desired, primary gas produced by the reaction.

SUMMARY OF THE INVENTION

The present invention satisfies the above objects by providing a pressure/reaction regulator for use with a reaction chamber of a gas generator that generates gas from a pressure-producing reaction of reactant metal pieces and reactant fluid. The regulator of the present invention includes a reaction-fluid accumulator in communication with the reaction chamber via a reactant-fluid port of the reaction chamber for adjusting pressure in the chamber relative to a preselected threshold pressure.

The regulator also includes a body extending substantially into the reaction chamber from the reactant-fluid port. Formed in and along a substantial portion of the body is port means for conveying fluid under pressure into and out of the chamber depending on whether reaction pressure rises or falls with respect to the preselected threshold pressure.

A second embodiment of the regulator is usable with a reaction chamber including plural reactant-fluid ports and itself includes plural bodies, one for each port. The bodies are divided into two groups, with the bodies of a first group each including a unidirectional fluid director for allowing fluid into the reaction chamber, and the bodies of a second group each including a unidirectional fluid director for allowing fluid to exit the reaction chamber. The fluid directors associated with the bodies of the second group include a counterweight for requiring pressure to rise by a preselected increment above the preselected threshold before they will open to allow fluid to exit the reaction chamber.

The invention also embodies an improved gas generator that generates gas from a pressure-producing reaction of reactant pieces and reactant fluid. The gas generator includes a supply of reactant pieces and a supply of reactant fluid, and a reaction chamber. The reaction chamber includes a side wall and a bottom surface with at least one reactant-fluid port formed in it to allow entry of the supply of reactant fluid. The chamber is also connected to a feed line for supplying reactant pieces to the chamber.

The gas generator of the invention also includes a first condenser sealingly connected to the chamber and including a gas-exit port. A pressure/reaction regulator is also included with a reaction-fluid accumulator in communication with the reaction chamber via the reactant-fluid port for adjusting pressure in the chamber relative to a preselected threshold pressure.

The gas generator of the invention further features a second condenser connected downstream of the first condenser via the gas-exit port. The second condenser includes a spinner rotatably mounted in it, and a liquid-trap portion for retaining liquid derived from condensed gases. Formed in the second condenser away from the liquid-trap portion is a gas-exit outlet. The spinner is operative to move heavy, contaminant gases away from the gas-exit outlet under reaction pressure, thus to promote the flow through the gas-exit outlet of only uncontaminated gas.

These and additional objects and advantages of the present invention will be more readily understood after a consideration of the drawings and the detailed description of the preferred embodiment.

BRIEF DESCRIPTION OF THE DRAWINGS

FIG. 2 is a top sectional view along line 2—2 of FIG. 1.

FIG. 3 is a fragmentary, bottom sectional view along line 3—3 of FIG. 1.

FIG. 4 is a top sectional view along line 4—4 of FIG. 1.

DETAILED DESCRIPTION OF THE PREFERRED EMBODIMENT

Figure 1:
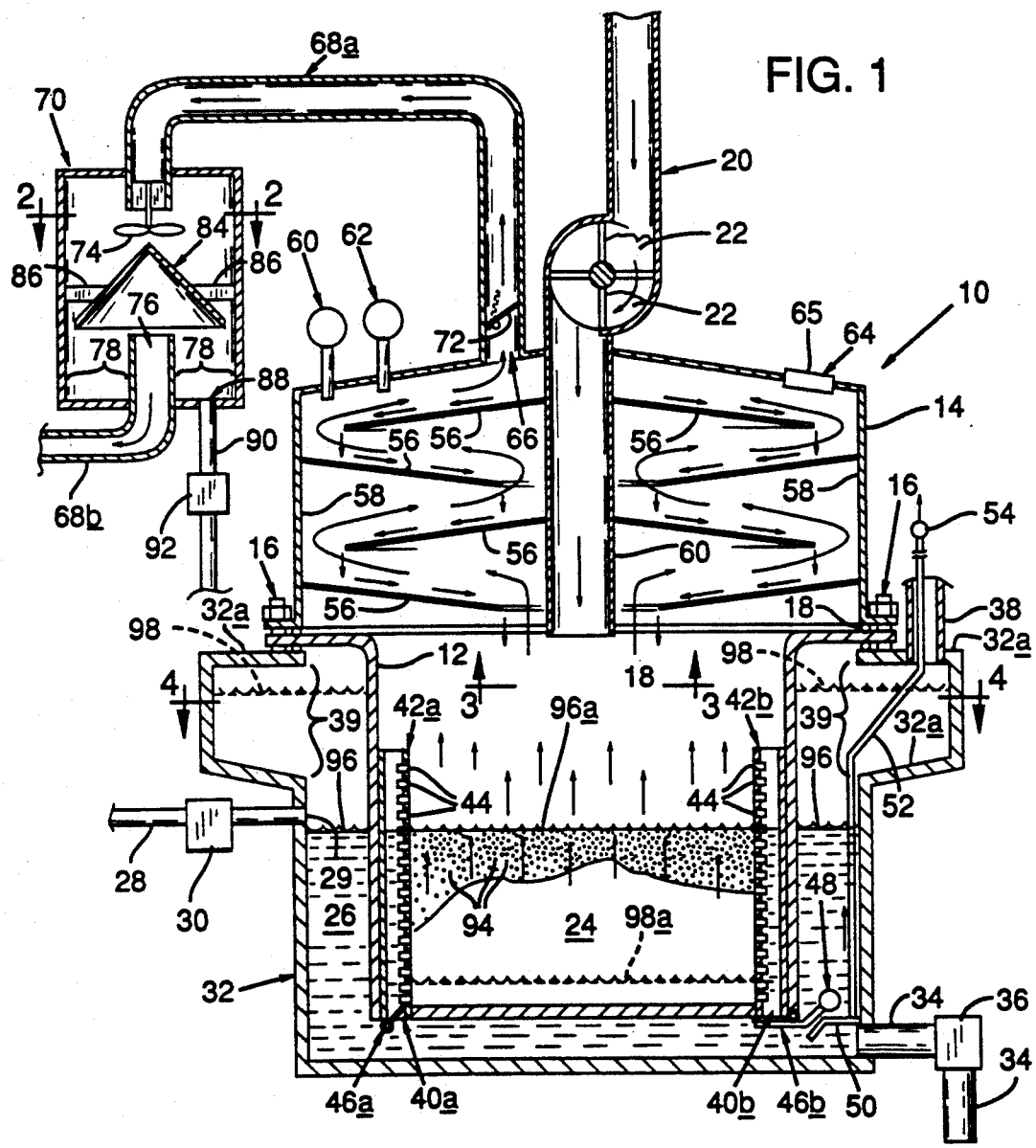
FIG. 1 shows the pressure/reaction regulator of the present invention in use with a reaction chamber of a gas generator also constructed in accordance with the invention.

Turning to the drawings, FIG. 1 shows at 10 the improved hydrogen-gas generator of the present invention including a reaction chamber 12. A first condenser 14 is sealingly connected to chamber 12 by fasteners 16 that are positioned through corresponding holes formed in both the chamber and the first condenser. It should be understood that stainless steel is preferred as the material for chamber 12 and condenser 14. The fasteners may take the form of nuts and bolts. A suitable O-ring 18 is sandwiched between chamber 12 and first condenser 14 to provide a sealed connection between both components.

Referring to FIGS. 1 and 3, condenser 14 is formed with a central opening through which a conventional air-lock feeder 20 is positioned for feeding desired amounts of a supply of reactant pieces, shown in relatively small piles at 22 in feeder 20 and in a relatively large pile at 24 on the bottom of chamber 12. The reactant pieces may be scrap aluminum with irregular shapes having cross sections of approximately 1-inch-3-inches. The feeder may be any conventional air-lock feeder and may be controlled by what is known as a Leslie-type pressure valve (undepicted).

Focusing on the left side of chamber 12 in FIG. 1, a supply of reactant fluid 26 is provided to chamber 12 via an intake tube 28 which is positioned in inlet 29. The reactant fluid may be a suitable blend of sodium hydroxide and water.

Continuing with the description of the left side of FIG. 1, an in-line control valve 30 is coupled to tube 28 for controlling the amount of fluid reactant introduced into chamber 12. The reactant fluid flows from tube 28 into an outer container 32 which surrounds chamber 12 and is also formed with holes for fasteners 16. Outer container 32 is preferably made of stainless steel and includes a top ledge 32a. Focusing on its right side, the outer container is fitted with a drain pipe 34 with an in-line control valve 36, and a vent pipe 38.

A reaction-fluid accumulator 39 is formed by that portion of container 32 that is above inlet 29. Accumulator 39 forms part of a soon-to-be-described pressure/reaction regulator.

Still referring to FIG. 1, reaction chamber 12 is formed with reactant-fluid ports 40a,b. Referring to FIGS. 1 and 4, extending substantially into chamber 12 from each port are bodies 42a,b with port means 44 formed along a substantial portion of each. As shown in FIG. 1, port means 44 may take the form of plural holes. Body 42a includes a unidirectional fluid director attached to it adjacent port 40a for allowing fluid into chamber 12, and body 42b includes a unidirectional fluid director 46b attached to it adjacent port 40b for allowing fluid to exit chamber 12. Fluid directors 46a,b may take the form of check valves pivotally attached to bodies 42a,b, respectively. Also, for reasons to be explained, check valve 46b includes a counterweight 48, which may be either integrally or externally attached to it.

The pressure/reaction regulator of the present invention includes accumulator 39, bodies 42a,b, check valves 46a,b, and counterweight 48.

Referring to the right side of FIG. 1, an angled plate 50 is attached to a rod 52 which extends upwardly through outer container 32 and vent pipe 38, and terminates in a handle 54. Handle 54 may be accessed by an operator of generator 10 who, by pulling handle 54 and rod 52, will open check valve 46b to drain reactant fluid 26 from chamber 12 during a to-be-described draining operation.

Referring in FIG. 1 to that portion of generator 10 above chamber 12 and outer container 32, and also referring to FIG. 3, condenser 14 includes plural circular condenser plates 56 which extend from an inside surface 58 of the first condenser and from a surface 60 of a portion of air-lock feeder 20 that is positioned inside the first condenser. Condenser 14 also includes suitable pressure and temperature gauges 60, 62, respectively. At the top right side of condenser 14, an access opening 64 is formed with a door 65 hingeably mounted therein to allow access to the inside of the first condenser.

Referring to the top of condenser 14 in FIG. 1, a gas-exit port 66 is formed for allowing reaction-generated hydrogen gas to exit condenser in the direction of the upwardly extending arrows. A pipe 68a connects condenser 14 to a second condenser 70. Pipe 68a is fitted with a check valve 72 for preventing backflow of gas and possibly fire, the latter being possible if the gas were to ignite downstream of condenser 14.

Referring to the top left portion of FIG. 1, hydrogen gas is conveyed through pipe 68a to second condenser 70. Referring to FIGS. 1 and 2, condenser 70 includes a spinner 74 also referred to as a means, for moving heavy contaminant gases away from a gas-exit outlet 76. Condenser 70 also includes a liquid-trap portion 78. Spinner 74 is rotatably mounted inside of pipe 68a, and extends out of the lower end of the pipe and into the interior of condenser 70.

Still referring to the upper left portion of FIG. 1, and to FIG. 2, condenser 70 includes a cone-shaped guard 84 positioned in it by suitable mounting structure 86. Guard 84 is positioned over gas-exit outlet 76 as an additional way of preventing liquid derived from condensed contaminant gases from entering outlet 76. Hydrogen gas is conveyed from condenser 70 through outlet 76 via a suitable pipe 68b.

Condenser 70 also includes an opening 88 fitted with a drain pipe 90 coupled to an in-line control valve 92.

OPERATION

In operation, reactant fluid 26 is introduced into reaction chamber 12 by opening control valve 30 and allowing fluid to flow through inlet 29 to chamber 12 via the inside of outer container 32, and the reactant-fluid port adjacent check valve 46a. The reactant fluid rises in body 42a and empties into chamber 12 by flowing through holes 44.

Still referring to FIG. 1, reactant pieces are fed into chamber 12 via feeder 20. When fluid 26 and reactant pieces in pile 24 come into contact, a known chemical reaction takes place which produces hydrogen gas, and other byproduct gases, such as steam. Those skilled in the art know that a reaction pressure is also produced by the reaction and that its magnitude depends on, among other known variables, the sizes of chamber 12 and condenser 14, the relative amounts of the reactants, and the sizes of the reactant pieces. The gaseous reaction products rise from pile 24 in the form of bubbles 94 (see FIG. 1) which continue to rise in the direction of the upwardly extending arrows through condenser 14 and into pipe 68a via port 66. Certain amounts of byproduct contaminant gases, such as steam, condense on condenser plates 56 and the resulting liquid condensate drops due to gravity back into chamber 12.

Still referring to FIG. 1, hydrogen gas continues from condenser 14 through pipe 68a and into the interior of second condenser 70. Referring to FIG. 2, the hydrogen gas flowing under reaction pressure causes spinner 74 to rotate clockwise as shown by the curved arrows. The movement of this spinner causes relatively heavier, contaminant byproduct gases to be moved away from gas-exit outlet 76 by driving such gases to the outer boundaries of the interior of condenser 70 where they will condense with the resulting liquid dropping into liquid-trap portion 78. The relatively lighter hydrogen gas will flow out through outlet 76 where it can be conveyed to a desired location via pipe 68b. Such a location may include a fuel-intake of a suitable hydrogen-gas-burning engine.

Second condenser 70 may be drained of contaminant liquid condensate by opening valve 92 to allow draining through opening 88 and pipe 90.

During operation, reaction pressure will fluctuate as noted above, depending on the amount of reactant fluid and reactant pieces present in chamber 12. Such fluctuation will also occur depending on the size of individual reactant pieces. For example, if relatively small pieces or shavings are used, the increased surface area offered by such pieces will increase the reaction rate and thus produce more hydrogen gas and byproducts at a faster rate. For a gas generator with the below-identified dimensions, I have found that reaction pressure fluctuates in the range of about 12- to about 18-inches of water when the reaction chamber is filled with about 10- to about 15-pounds of scrap aluminum reactant pieces:

| outer container | 18-inches (dia.) × 18-inches; |
| reaction chamber | 12-inches (dia.) × 18-inches; and |
| first condenser | 12-inches (dia.) × 18-inches. |

The pressure range mentioned above may be thought of as a preselected threshold pressure range. Such a range is preselected in the sense that choosing the size of the generator will control the operational pressure range. If reaction rate increases due to any one or combinations of the above-identified variables, the pressure/reaction regulator of the present invention adjusts pressure in chamber 12 relative to the preselected threshold pressure range.

For example, referring to FIG. 1, reactant fluid 26 is filled to an operational level 96 in container 32 and 96a in chamber 12. If pressure in chamber 12 rises above 12-inches of water, the pressure will force reactant fluid downwardly out of the chamber through port 40b. From chamber 12, the fluid will flow into accumulator 39 where the fluid level will rise to a high-pressure level 98. At the same time, the level of reactant fluid in chamber 12 will decrease to a high-pressure level of 98a.

When the level of reactant fluid is at 98a in chamber 12, reaction rate will slow and thus reaction pressure will decrease. As pressure decreases, reactant fluid will be allowed to flow back into chamber 12 via the reactant-fluid port associated with check valve 46a.

Bodies 42a,b aid in regulating pressure/reaction by providing port means having a cross-sectional area that is relatively small compared to the entire cross sectional area of the bottom surface of chamber 12. Thus, relatively slight changes in reaction pressure will cause only slight changes in the level of fluid in chamber 12. Such slight changes in reactant-fluid level will cause only slight changes in reaction rate because the reactant fluid level will remain relatively constant over an operational range of pressure.

To provide a wider range of operational pressure, counterweight 48 is attached to check valve 46b. Thus, a somewhat greater reaction pressure will be required to open check valve 46b.

It should be understood that the pressure/reaction regulator of the present invention may include as few as one body 42a, and that single body need not have a check valve associated with it.

When using sodium hydroxide as the reactant fluid, I have found that reaction temperature is approximately in the range of about 160° F. to about 220° F. The lower part of the range was obtained when adding relatively small percentages of salt to the reactant fluid. By maintaining a relatively low reaction temperature, the gas generator of the present invention does not require the elaborate condensers and other gas-purifying components required by conventional high-temperature hydrogen gas generators.

Further dissipation of reaction-produced heat is obtainable by positioning conventional fins (undepicted) along the outside of first condenser 14 and pipe 68a.

While the present invention has been shown and described with reference to the foregoing preferred embodiment, it will be apparent to those skilled in the art that other changes in form and detail may be made therein without departing from the spirit and scope of the invention as defined in the appended claims.

What is claimed is:

1. A gas generator that generates gas from a pressure-producing reaction of reactant pieces and reactant fluid, comprising:

a reaction chamber with plural reactant-fluid ports formed therein;

a condenser sealingly connected to the chamber and including a gas-exit port;

a reactant-fluid accumulator for adjusting pressure in the chamber relative to a preselected threshold pressure, with said accumulator surrounding said chamber and in communication with the inside of it via said reactant-fluid ports;

plural conduits extending substantially into the reaction chamber from each of said reactant-fluid ports, each of said conduits being connected to a corresponding reactant-fluid port and having port means formed therein along a substantial portion thereof for conveying fluid under pressure into and out of the chamber depending on whether reaction pressure rises or falls with respect to such preselected threshold pressure; and wherein said conduits are divided into two groups, with each conduit of a first group including a unidirectional fluid director capable of allowing fluid into the reaction chamber, and with each conduit of a second group including a unidirectional fluid director capable of allowing fluid to exit the reaction chamber.

2. The generator of claim 1, wherein the total number of conduits is two.

3. The generator of claim 2 wherein the fluid director associated with the body of the second group includes a counterweight for requiring pressure to rise by a preselected increment above the preselected threshold before the letter fluid director will open to allow fluid to exit the reaction chamber.

4. The generator of claims 1 or 2, wherein said port means takes the form of plural holes formed in each conduit.

5. An gas generator that generates gas from a pressure-producing reaction of reactant pieces and reactant fluid, comprising:
   a reaction chamber including a side wall and a bottom surface with at least one reactant-fluid port formed therein to allow entry of a supply of reactant fluid, said chamber also being connection therein to a feed line for conveying a supply of reactant pieces to the chamber;
   a first condenser sealingly connected to said chamber and including a gas-exit port; and
   a pressure/reaction regulator including a reaction-fluid accumulator in communication with the reaction chamber via the reactant-fluid port and capable of adjusting pressure in the chamber relative to a preselected threshold pressure.

6. The generator of claim 5 wherein said regulator further includes a body extending into the chamber from the reactant-fluid port, the body having port means formed therein along a substantial portion thereof for conveying fluid under pressure into and out of the chamber depending on whether reaction pressure rises or falls with respect to a preselected threshold pressure.

7. The generator of claim 6 wherein said reaction chamber has plural reactant-fluid ports and wherein said regulator includes plural bodies.

8. The generator of claim 7 wherein said bodies are divided into two groups, with said bodies of a first group each including a unidirectional fluid director capable of allowing a fluid into the reaction chamber, and said bodies of a second group each including a unidirectional fluid director capable of allowing fluid to exit the reaction chamber.

9. The generator of claim 8, wherein the total number of bodies is two.

10. The generator of claim 9 wherein the fluid director associated with the body of the second group includes a counterweight for requiring pressure to rise by a preselected increment above the preselected threshold before the latter fluid director will open to allow fluid to exit the reaction chamber.

11. The generator of claim 6 wherein said port means is formed with plural holes.

12. The generator of claims 8 or 9, wherein said port means takes the form of plural holes formed in each body.

13. The generator of claim 5 further including a second condenser connected to said first condenser via the gas-exit port, said second condenser including a housing with a spinner rotatably mounted therein, a liquid-trap portion defined in said housing for retaining liquid derived from condensed gases, and a gas-exit outlet formed in said housing away from said liquid-trap portion, said spinner being operative to move heavy, contaminant gases away from the gas-exit outlet under reaction pressure, thus to promote the flow through the gas-exit outlet of only uncontaminated gas.

14. The generator of claim 12 further including a second condenser connection to said first condenser via the gas-exit port, said second condenser including a housing with a liquid-trap portion defined in said housing for retaining liquid derived from condensed gases, a gas-exit outlet formed in said housing away from said liquid-trap portion, and means rotatably mounted therein for moving heavy, contaminant gases away from the gas-exit outlet under reaction pressure, thus to promote the flow through the gas-exit outlet of only uncontaminated gas.

* * * * *